J. HAMILTON,

Assignor of one-half interest to I. EATON.

Spindle for Loom-Shuttles.

No. 9,093. Reissued Feb. 24, 1880.

Witnesses

Henry Howson Jr.

Harry Smith

Inventor

James Hamilton by his Attorneys

Howson and Son

UNITED STATES PATENT OFFICE.

JAMES HAMILTON, OF GREAT FALLS, ASSIGNOR OF ONE-HALF OF HIS INTEREST TO ISAAC EATON, OF NASHUA, NEW HAMPSHIRE.

SPINDLE FOR LOOM-SHUTTLES.

SPECIFICATION forming part of Reissued Letters Patent No. 9,093, dated February 24, 1880.

Original No. 192,692, dated July 3, 1877. Application for reissue filed January 10, 1880.

*To all whom it may concern:*

Be it known that I, JAMES HAMILTON, a citizen of the United States, residing at Great Falls, New Hampshire, have invented certain Improvements in Spindles for Loom-Shuttles, of which the following is a specification.

My invention consists in combining with the body of a shuttle a spindle consisting of two arms separately pivoted to the said body, and arranged to bear against each other, all substantially as described hereinafter, so that when the spindle is raised from the body of the shuttle it will be contracted enough to easily receive the cop, and when depressed will be expanded.

My invention further consists of a spindle having two arms, the point of one fitting into a groove of the other, in combination with the body of the shuttle, and with two pivot-pins, by which the two arms are separately connected to the said body, the object of this feature of my invention being to maintain the arms in their proper relative positions laterally.

Figure 1:
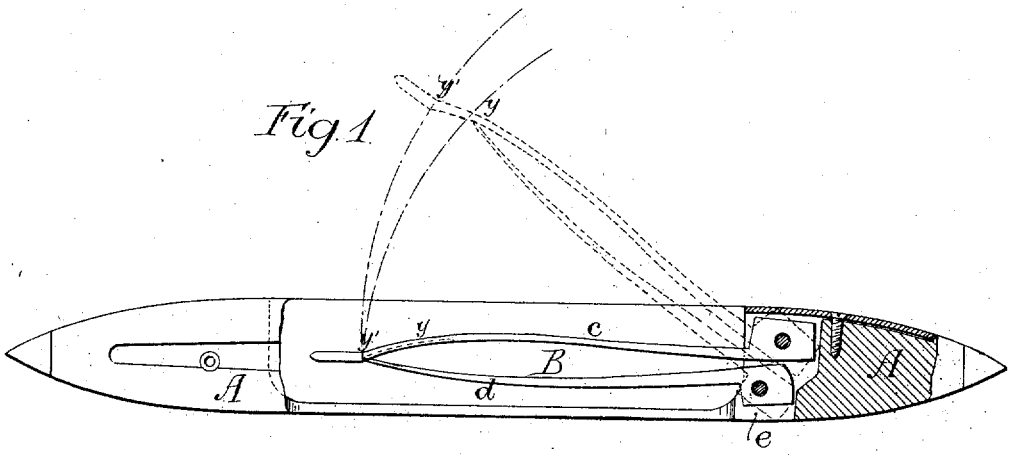
Figure 2:
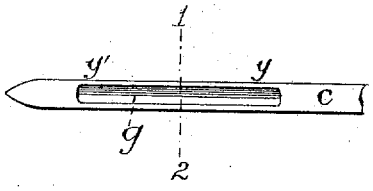
Figure 5:
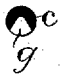

In the accompanying drawings, Figure 1 is a side view, partly in section, of a shuttle provided with my improved spindle; Fig. 2, a view of part of the grooved arm of the spindle; and Fig. 3, a transverse section on the line 1 2, Fig. 2.

The body or stock A of the shuttle is of the usual form; but the spindle B consists of two arms, *c* and *d*, which are pivoted separately to the said body, the flat butts of the two arms fitting snugly, but so as to move freely, in the slot or recess *e*, and the pivot-pin *c'* of the arm *c* being placed in rear of the pivot *d'* of the arm *d*.

The end of the short arm *d* of the spindle bears against the under side of the long arm, where the latter is curved from *y* to *y'*, as shown, so that when the said spindle has been raised to the position shown by dotted lines it will be contracted for receiving the cop; but on turning down the spindle into the body of the shuttle the free end of the arm *d* will, owing to the relation of the pivot-pins to each other, slide against the under side of the curved portion of the arm *c* from *y* to *y'*, and the spindle will consequently be expanded, so as to retain the cop.

The under side of the portion *y y'* of the arm *c* has a longitudinal groove for receiving the end of the arm *d*, the two arms being thus maintained in their proper relative positions laterally.

I claim as my invention—

1. The combination, with the body of a shuttle, of a spindle consisting of two arms separately pivoted to the said body, and arranged to bear against each other, all substantially as and for the purpose set forth.

2. The spindle having two arms, *c d*, the end of one being adapted to a groove in the other, in combination with the body A of the shuttle and the pivot-pins *c' d'*, substantially as set forth.

In testimony whereof I have signed my name to this specification in the presence of two subscribing witnesses.

JAMES HAMILTON.

Witnesses:
MARTIN L. LORD,
JOHN T. WOOD.